United States Patent Office 2,803,650
Patented Aug. 20, 1957

2,803,650

NEODIHYDROSTREPTOMYCIN AND ACID ADDITION SALTS

Teijiro Yabuta, Hiroshi Ikeda, Kenji Shiroyanagi, Itsuo Fujimaki, and Mitsuhiko Katayama, Tokyo, Japan No Drawing. Application April 8, 1955, Serial No. 500,306

Claims priority, application Japan March 5, 1955

11 Claims. (Cl. 260—210)

This invention relates to the preparation of new and therapeutically useful antibiotic substances, and particularly to the new antibiotic substance, neodihydrostreptomycin, and acid salts thereof and the process for preparing the same by the reduction of acid salts of streptomycin with amalgamated aluminum.

It is known that streptomycin is obtained from elaboration products, formed during the growth of the microorganism *Actinomyces griseus* in a suitable culture medium, by adsorbing the broth filtrate on carboxylic-type cation exchange resin followed by elution with a mineral acid. The product so obtained is a streptomycin salt, such as streptomycin trihydrochloride of relatively low potency or antibiotic activity. It can be further purified by solvent method, precipitation method and preferably by crystallization method. In copending application, Serial No. 306,738, filed August 27, 1952, we have disclosed that streptomycin interacts with polyhalophenol to form a salt-type combination (streptomycin-polyhalophenate) which is sparingly soluble in water and very soluble in certain organic solvents, and have also disclosed that the streptomycin-polyhalophenate may be decomposed by mineral acids to recover the streptomycin acid salts of high potency.

While the streptomycin acid salts thus obtained are in a form suitable for therapeutic use, it is found that these compounds have certain inherent disadvantages including a degree of chemical instability evidenced particularly in media containing components capable of reacting with carbonyl groups. Streptomycin contains a carbonyl group demonstable with reagents such as semicarbazide, thiosemicarbazide, hydroxylamine and phenylhydrazine (Brink, Kuehl, Jr., and Folkers, Science, 102, 506, 1945); and on treatment with alkali, it is rapidly degraded with loss of its antibiotic activity (Barts, Controulis, Crocks, Jr., and Rebstock, J. Am. Chem. Soc., 68, 2165, 1946), yielding streptidine (Ikeda, Ikeda and Fujimaki, J. Scientific Research Inst., Japan, 46, 255, 1952). Among other products formed on alkaline degradation of streptomycin is maltol (Schenk and Spielman, J. Am. Chem. Soc., 67, 2276, 1945); the formation of maltol being contingent on the presence of a carbonyl group in streptomycin.

It is also known (Peck et al., J. Am. Chem. Soc., 68, 1390, 1946; Bartz et al., ibid., 68, 2163, 1946; Carboni and Regna, U. S. Patent 2,522,858, 1950; Peck, U. S. Patent 2,498,574, 1950) that streptomycin or acid addition salts thereof is subjected to catalytic hydrogenation, one mole of hydrogen per mole of streptomycin is taken up, and that the resulting dihydrostreptomycin or acid addition salt thereof is antibiotically active and is suitable for clinical application. An electrochemical procedure (Ohdake et al., Repts. Sci. Research Inst., Japan, 28, 103, 1952) and a sodium borohydride method (Kaplan et al., J. Am. Chem. Soc., 76, 5161, 1954) for the reduction of streptomycin have also been reported. Unlike streptomycin, dihydrostreptomycin remains unchanged when treated with alkali at room temperature. Inasmuch as the product does not react with carbonyl reagents and is not degraded by alkali with the liberation of maltol, it is clear that the carbonyl group of streptomycin has been reduced to carbinol.

An object of this invention is to provide a new antibiotic and the salts thereof. A further object is to prepare a novel therapeutically active salt of neodihydrostreptomycin. Further objects will appear hereinafter.

It is now discovered, according to the present invention, that when a streptomycin salt is treated with amalgamated aluminum in an aqueous or solvent medium at the pH range from 2.0 to 2.5, the corresponding neodihydrostreptomycin (named by us) compond is formed.

We have also found that when an acid salt of streptomycin is subjected to the above mentioned reaction at the pH ranges of 8.5 to 9.0 and 2.6 to 8.4, corresponding dihydrostreptomycin salt and the mixture of neodihydrostreptomycin salt and dihydrostreptomycin salt are formed respectively.

When dihydrostreptomycin is heated in an acid solution, its ultraviolet spectrogram shows adsorption maximum at 265 m$\mu$ (Hiscox, Anal. Chem., 23, 923, 1951). We have found also that when neodihydrostreptomycin is treated similarly, no absorption is observed. Hence, dihydrostreptomycin may be determined spectrophotometrically as described above in the mixture of neodihydrostreptomycin and dihydrostreptomycin.

The results given in the following Table 1 are presented to illustrate the reaction of our invention.

TABLE 1

| The pH of reaction mixture | Dihydro-streptomycin obtained (percent) | Neodihydro-streptomycin obtained (percent) |
|---|---|---|
| 2 | 0~3 | 97~100 |
| 2.5 | 3~5 | 95~97 |
| 3 | 15 | 85 |
| 4 | 20 | 80 |
| 6 | 30 | 70 |
| 7 | 40 | 60 |
| 8 | 55 | 45 |
| 8.5 | 93~97 | 3~7 |
| 9 | 98~100 | 0~2 |

On the other hand, Fried and Wintersteiner (U. S. Patent 2,552,547) have reported that dihydrostreptomycin may be obtained by subjecting streptomycin to the action of amalgamated aluminum in a non-alkaline (i. e., acid or neutral) medium. However, on the basis of the above mentioned our discovery it is evident that pure dihydrostreptomycin is not able to be obtained under the condition which was described by Fried and Wintersteiner.

The neodihydrostreptomycin compounds are approximately as active antibiotically as the streptomycin or dihydrostreptomycin salts and are equally suitable for clinical application.

Neodihydrostreptomycin is chemically distinct from known types of streptomycin in accordance with the following facts and evidences. In contradistinction to streptomycin but similar to dihydrostreptomycin, the neodihydrostreptomycin is not inactivated by exposure to alkali at room temperature, in other words, the degradation of the molecule to streptidine, maltol and N-methyl-L-glucosamine, which is brought about by the action of this reagent on streptomycin, is blocked as a consequence of the reductive change; and it is clear that the carbonyl group of streptomycin (which resides in the maltol "gamma-pyrone" forming moiety) has been reduced to carbinol.

Acid degradation of neodihydrostreptomycin produces streptidine and N-methyl-L-glucosamine components identical with those given by streptomycin or dihydrostreptomycin; hence, the reduction with amalgamated aluminum involves only the streptose moiety. Furthermore, dihydrostreptomycin reacts with methanol containing dry hydrogen chloride to give in good yield the crystalline α-methyl-pentaacetyl-dihydrostreptobiosaminide, M. P. 194° C. Neodihydrostreptomycin, under identical conditions, yields no crystalline compound.

Neodihydrostreptomycin is oxidized with sodium methaperiodate or periodic acid. Formaldehyde is formed and estimated by chromotropic acid (Vail and Bricker, Anal. Chem. 24, 975, 1952). Both of streptomycin and neodihydrostreptomycin give 0.6 mole of formaldehyde per mole; dihydrostreptomycin yields 1.6 mole.

Neodihydrostreptomycin can be resolved chromatographically from admixture with streptomycin and dihydrostreptomycin. For example, a paper strip may be spotted with a solution of the substances alone or in binary or ternary admixture. The strips are then developed chromatographically in accordance with known methods. The developed paper strips are then placed upon an agar plate, the surface of which has been inoculated with a test organism such as B. subtilis. After a period of time the positions of the resolved antibiotic substances are shown by separate zones of inhibition. The measured ratio of distance traveled along the strip for neodihydrostreptomycin compared with streptomycin was 0.3. The ratio of distance for neodihydrostreptomycin compared with dihydrostreptomycin was 0.7.

Other characteristic distinctions between neodihydrostreptomycin and dihydrostreptomycin are shown in Table 2.

TABLE 2

| | Dihydro-streptomycin | Neodihydro-streptomycin |
|---|---|---|
| M. P. (crystalline free base) [1] | no M. P. up to 300°.[2] | 190–195°, details are shown in Example 1. |
| Potency (free base) units/mgm.: | | |
| biological | 980 | 1,100. |
| streptidine [3] | 1,000 | 920. |
| $[\alpha]_D^{17}$ (free base; c., 1% in water) | −96.0 | −106.2. |
| $LD_{50}$ in mgm. of base/kg. (mouse) | 280 | 350. |
| Nogueira's color reaction [4] | positive | negative. |
| Ultraviolet spectrogram of the acid degraded substance.[5] | maximum at 265 mμ. | no absorption. |
| M. P. of the helianthate | 225° | 215°. |
| M. P. of the reineckate | 200° | 180°. |
| M. P. of the naphthalene-β-sulfonate | 185° | 173°. |
| M. P. of the p-(2-hydroxy-1-naphthyl-azo)-benzenesulfonate. | 230° | 224°. |
| α - Methyl - pentaacetyldihydrostreptobiosaminide. | needle crystal M. P. 194°. | no crystallization. |

[1] All melting points were taken in the capillary and were uncorrected.
[2] Rhodehamel et al., Science, 111, 233 (1950).
[3] Sullivan and Hilmer, Amer. Chem. Soc. Abstracts of 109th Convention. Div. Biol. Chem., p. 4B. 1946.
[4] Nogueira, Rev. port. farm., 1, 55 (1951): Chem. Abst., 9258 (1952).
[5] Hiscox, Anal. Chem., 23, 923 (1951).

Regarded in certain of the broader aspects, novel features of the present invention comprise the new and therapeutically useful antibiotic substance of the class consisting of neodihydrostreptomycin and acid salts thereof and the process for preparing the same by the reduction of acid salts of streptomycin with amalgamated aluminum (prepared according to Organic Synthesis, Collective Volume II, 397).

The acid salts contemplated in the present invention are acid salts in which the acid moiety resists reduction. Suitable acid salts are mineral acid salts and organic acid salts in which the acid moiety contains no reducible groups.

In carrying out the process in accordance with the present invention a quantity of an acid salt of streptomycin is dissolved in water, the pH is adjusted to 2.0~2.5 with dilute mineral or organic acid solution, in which is charged with a amalgamated aluminum and agitated for a time sufficient to completely reduce the streptomycin to neodihydrostreptomycin (less than 1% residual streptomycin by maltol test) during which time the pH of the reaction mixture being adjusted to 2.0~2.5 with an acid solution. The amount of amalgamated aluminum used is not critical in the reaction although the rate of the reduction is increased or decreased with an increase or decrease in the amount of amalgamated aluminum. The amalgamated aluminum may be effected in any medium which does not chemically affect streptomycin, inter alia, methanol, butanol or (preferably) water.

Various acids with which the pH of reaction mixture is adjusted are ordinary mineral acids and preferably those of which the ionization constants (K) are $10^{-2}$~$10^{-4}$.

As starting materials, it is possible to use impure concentrates of streptomycin salts, but it is preferred to use a substantially pure acid salt for the process.

After completion of the reduction, the aluminum compound is removed by filtration and the neodihydrostreptomycin may be obtained from the filtrate in the form of, or converted into, the free base or various acid addition salts thereof. The free base can be prepared from the above filtrate by subjecting it to a reaction with a base or basic hydroxide which forms substantially quantitatively the insoluble salts with the acid ions of the streptomycin salt and the acid with which the pH of the reaction mixture is adjusted. Thus, for example, reacting an aqueous solution of the mixture of neodihydrostreptomycin sulfate and sulfuric acid with the stoichiometric equivalent of barium hydroxide precipitates the sulfate ion as insoluble barium sulfate which is readily removed by filtration and the free base can then be recovered from the filtrate by crystallization from suitable aqueous-organic solvent (e.g. aqueous-acetone) or by freeze-drying. The various acid addition salts of neodihydrostreptomycin can be prepared from the above free base by neutralizing it with the acids. The product is, of course, obtainable in substantially-pure form directly by the reduction of substantially-pure streptomycin acid addition salt.

The acid addition salts of neodihydrostreptomycin can also be prepared directly from the above reaction filtrate by subjecting it (after neutralizing the free acid with an alkali which forms the soluble salt) to a reaction with an aqueous solution of an alkali salt of a polyhalophenol. The precipitated neodihydrostreptomycin-polyhalophenate is sparingly soluble in water. After washing the precipitate with water, the precipitate is dissolved in an water-immiscible organic solvent and the neodihydrostreptomycin-polyhalophenate therein is converted into a water soluble salt of this antibiotic by intimately contacting the organic solvent solution with an aqueous water-soluble inorganic or organic acid, and recovering the aqueous phase, and freeze-drying it.

The following examples illustrate methods of carrying out the present invention, but it is to be understood that these examples are given by way of illustration and not of limitation.

*Example 1*

46 gm. of streptomycin sulfate (790 units/mgm.) is dissolved in 150 ml. of water. The pH is adjusted to 2.0 with dilute sulfuric acid and 10 gm. of amalgamated aluminum is added. The mixture is agitated at room temperature during which time the pH of the reaction mixture being adjusted to 2.0~2.5 with dilute sulfuric acid. After about two hours' agitation, 2 gm. of amalgamated aluminum is added to increase the rate of reduction, the end-point of reduction being determined by assay for residual streptomycin by the maltol method (Boxer et.

al., J. Biol. Chem., 169, 53, 1947). After completion of the reduction (the time of reduction is required about four hours), the aluminum compound is filtered off and to this filtrate saturated aqueous barium hydroxide solution is slowly added. The barium sulfate formed is removed by filtration. Tests for barium and sulfate ions in the clear filtrate are negative. The filtrate is then mixed with three volumes of acetone causing slow separation of soft needle crystals weighing about 25 gm. The free base thus obtained, neodihydrostreptomycin, shows an activity of 1,100 units/mgm. (assayed biologically) and melts at 106~107° C. with a very small bubbling, resolidifying at about 110~120° C., and finally melts at about 190~195° C. with the formation of a brown-yellow color and with the evolution of a small amount of gas. The optical rotation is $[\alpha]_D^{17}$ —106.2 (C., 1% in water).

*Analysis.*—Calcd. for $C_{21}H_{41}N_7O_{12}$: C, 43.28; H, 6.96; N, 16.81. Found: C, 42.97; H, 7.10; N, 16.35. Molecular weight: 583.6.

The neodihydrostreptomycin base obtained may also be recrystallized from hot water.

*Example II*

Crystalline neodihydrostreptomycin base obtained as described in Example I, may be converted into various acid addition salts thereof.

(a) The sesquisulfate and trihydrochloride may be obtained by adding the equivalent amount of sulfuric acid or hydrochloric acid, respectively, to the base in aqueous solution, and freeze-drying the resulting solution.

(b) 1.2 gm. of neodihydrostreptomycin trihydrochloride obtained as described in the foregoing section, and having a potency of 890 units/mgm., is dissolved in 15 ml. of water and a solution of 2 gm. of ammonium reineckate in 110 ml. of water at 45° C. is added. On cooling neodihydrostreptomycin reineckate crystallizes in long needles melting with decomposition at 178~180° C. (uncorrected).

*Analysis.*—
Calcd. for $C_{21}H_{41}N_7O_{12} \cdot 3HCr(SCN)_4(NH_3)_2$: C, 25.72; H, 4.06; N, 22.71. Found: C, 25.77; H, 4.13; N, 23.08.

(c) 1.2 gm. of neodihydrostreptomycin trihydrochloride obtained as described in the foregoing section, and having a potency of 890 units/mgm., is dissolved in 15 ml. of water, and a hot solution of 1.8 gm. of methylorange in 70 ml. of 50% aqueous methanol is added. Orange crystals separate immediately from the solution and the product obtained after two recrystallizations from 50% aqueous methanol melted with decomposition at 215° C. (uncorrected).

*Analysis.*—Calcd. for $C_{21}H_{41}N_7O_{12} \cdot 3(C_{14}H_{15}N_3O_3S)$: C, 50.46; H, 5.79; N, 14.94. Found: C, 50.67; H, 5.75; N, 14.91.

*Example III*

14 gm. of neodihydrostreptomycin sesquisulfate obtained as described in Example II is dissolved in 15 ml. of water. 4.5 gm. of sodium iodide, dissolved in 5 ml. of water, is added and the solution is allowed to stand for several hours. The prismatic crystals of neodihydrostreptomycin-iodide-sulfate double salt are filtered and washed with cold water. The crystal is recrystallized from hot water.

*Analysis.*—Calcd. for $C_{21}H_{41}N_7O_{12} \cdot HI \cdot HSO:I$, 15.99. Found: I, 15.85.

*Example IV*

80 gm. of partially purified streptomycinsulfate (700 units/mgm.) is dissolved in 500 ml. of water. The pH is adjusted to 2.0 with dilute phosphoric acid solution and 18 gm. of amalgamated aluminum is added. The mixture is then agitated mechanically at room temperature during which time the pH of the reaction mixture is always adjusted to 2.0~2.5 with dilute phosphoric acid solution. After two hours' agitation, 3 gm. of amalgamated aluminum is added to increase the rate of reduction, the end-point of reduction being determined by assay for residual streptomycin by the maltol method. After completion of the reduction, the aluminum compound is filtered off and the pH is adjusted to 6.5 with aqueous sodium hydroxide solution. 15% aqueous sodium pentachlorophenate solution is added to this filtrate under stirring until the test shows complete precipitation, the precipitate is washed with water and separated by filtration. The precipitate is dissolved in 100 ml. of n-butanol, insoluble impurities are filtered off and 10% of the aqueous sulfuric acid solution is added to the filtrate until the pH of the water layer is adjusted to 6.5. The water layer is recovered and poured into 300 ml. of methanol, the resulting precipitate of neodihydrostreptomycin sesquisulfate is recovered by filtration, washed with methanol and dried under reduced pressure. The product has an activity of 830 units/mgm.

Modifications may be made in carrying out the present invention without departing from the spirit and scope thereof, and our invention is to be limited only by the appended claims.

We claim:

1. A substance of the class consisting of neodihydrostreptomycin and the acid addition salts thereof, said substance being produced by reacting an acid salt of streptomycin with amalgamated aluminum at a pH of 2.0 to 2.5.

2. Neodihydrostreptomycin produced by reacting an acid salt of streptomycin with amalgamated aluminum at a pH of 2.0 to 2.5.

3. Neodihydrostreptomycin sulfate produced by reacting an acid salt of streptomycin with amalgamated aluminum at a pH of 2.0 to 2.5.

4. Neodihydrostreptomycin hydrochloride produced by reacting an acid salt of streptomycin with amalgamated aluminum at a pH of 2.0 to 2.5.

5. Neodihydrostreptomycin iodide sulfate produced by reacting an acid salt of streptomycin with amalgamated aluminum at a pH of 2.0 to 2.5.

6. Neodihydrostreptomycin pentachlorophenate produced by reacting an acid salt of streptomycin with amalgamated aluminum at a pH of 2.0 to 2.5.

7. The process that comprises reacting an acid salt of streptomycin with amalgamated aluminum at a pH of 2.0 to 2.5, removing the salt component of neodihydrostreptomycin acid salt thus formed and the acid used for establishing the pH of the reaction mixture by adding stoichiometric equivalent of a base which forms an insoluble compound with said salt component and acid, filtering off the insoluble compound, and recovering from the filtrate the free base, neodihydrostreptomycin.

8. The process that comprises reacting streptomycin sulfate with amalgamated aluminum at a pH of 2.0 to 2.5, removing the sulfate component of the neodihydrostreptomycin sulfate thus formed and the sulfuric acid used to establish the pH of the reaction mixture by adding the stoichiometric equivalent of barium hydroxide and precipitating barium sulfate, filtering off the precipitate, and recovering from the filtrate the free base, neodihydrostreptomycin.

9. The process defined in claim 10, further comprising the step of neutralizing the neodihydrostreptomycin base with an acid solution and recovering the acid addition salt thereof.

10. The process of obtaining highly purified neodihydrostreptomycin salt which comprises reacting a partially purified acid salt of streptomycin with amalgamated aluminum at the pH range from 2.0 to 2.5 and treating the reaction filtrate with an alkali salt of a polyhalophenol to form a salt-type combination product of neodihydrostreptomycin and the polyhalophenol, recovering said product, and converting the product into a water-soluble acid addition salt of the neodihydrostreptomycin.

11. The process of obtaining highly purified neodihydrostreptomycin sulfate which comprises reacting partially purified streptomycin sulfate with amalgamated aluminum at the pH range from 2.0 to 2.5 and treating the reaction filtrate with sodium salt of pentachlorophenol to form the neodihydrostreptomycin-pentachlorophenate, recovering the product, and converting it into the neodihydrostreptomycin sulfate.

References Cited in the file of this patent

UNITED STATES PATENTS 2,552,547  Fried et al. _____ May 15, 1951